US012578502B2

(12) United States Patent

Heng et al.

(10) Patent No.: US 12,578,502 B2

(45) **Date of Patent: \*Mar. 17, 2026**

(54) WEATHER-DRIVEN MULTI-CATEGORY INFRASTRUCTURE IMPACT FORECASTING

(71) Applicant: Utopus Insights, Inc., Valhalla, NY (US)

(72) Inventors: Fook-Luen Heng, Yorktown Heights, NY (US); Zhiguo Li, Yorktown Heights, NY (US); Stuart A. Siegel, Millburn, NY (US); Amith Singhee, Bangalore (IN); Haijing Wang, Valhalla, NY (US)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,748

(22) Filed: Feb. 10, 2023

(65) Prior Publication Data

US 2023/0194756 A1    Jun. 22, 2023

Related U.S. Application Data

(63) Continuation of application No. 17/224,116, filed on Apr. 6, 2021, now Pat. No. 11,598,900, which is a (Continued)

(51) Int. Cl.
*G01W 1/10* (2006.01)
*G06N 5/04* (2023.01)
(Continued)

(52) U.S. Cl.
CPC ............... *G01W 1/10* (2013.01); *G06N 5/04* (2013.01); *G06N 7/01* (2023.01); *G06N 20/00* (2019.01); *G06Q 10/06315* (2013.01)

(58) Field of Classification Search
CPC .......... G01W 1/10; G06N 5/04; G06N 7/005; G06N 20/00; G06Q 10/06315
See application file for complete search history.

(56) References Cited

U.S. PATENT DOCUMENTS

| | | | |
|---|---|---|---|
| 7,920,997 | B2 | 4/2011 | Domijan et al. |
| 8,280,633 | B1 | 10/2012 | Eldering et al. |

(Continued)

FOREIGN PATENT DOCUMENTS

| | | |
|---|---|---|
| WO | 2015013249 A2 | 1/2015 |
| WO | 2015112892 A1 | 7/2015 |

OTHER PUBLICATIONS

Domijan, Jr., A. et al., "Effects of Normal Weather Conditions on Interruptions in Distribution Systems," International Journal of Power and Energy Systems, vol. 25, No. 1, 2005.

(Continued)

*Primary Examiner* — Brandon S Cole
(74) *Attorney, Agent, or Firm* — Ahmann Kloke LLP

(57) ABSTRACT

A method, system, and computer program product for resource management are described. The method includes selecting trouble regions within the service area, generating clustered regions, and training a trouble forecast model for the trouble regions for each type of damage, the training for each trouble region using training data from every trouble region within the clustered region associated with the trouble region. The method also includes applying the trouble forecast model for each trouble region within the service area for each type of damage, determining a trouble forecast for the service area for each type of damage based on the trouble forecast for each of the trouble regions within the service area, and determining a job forecast for the (Continued)

service area based on the trouble forecast for the service area, wherein the managing resources is based on the job forecast for the service area.

18 Claims, 4 Drawing Sheets

Related U.S. Application Data continuation of application No. 16/546,268, filed on Aug. 20, 2019, now Pat. No. 11,048,021, which is a continuation of application No. 15/287,846, filed on Oct. 7, 2016, now Pat. No. 10,387,802, which is a continuation of application No. 15/075,603, filed on Mar. 21, 2016, now Pat. No. 9,536,214, which is a continuation of application No. 15/002,494, filed on Jan. 21, 2016, now Pat. No. 10,989,838.

(60) Provisional application No. 62/147,003, filed on Apr. 14, 2015.

(51) Int. Cl.

| | | |
|---|---|---|
| *G06N 7/00* | (2023.01) | |
| *G06N 7/01* | (2023.01) | |
| *G06N 20/00* | (2019.01) | |
| *G06Q 10/06* | (2023.01) | |
| *G06Q 10/0631* | (2023.01) | |

(56) References Cited

U.S. PATENT DOCUMENTS

| | | | |
|---|---|---|---|
| 8,494,774 B2 | 7/2013 | Pasken et al. | |
| 8,682,623 B1 | 3/2014 | Domijan et al. | |
| 9,230,289 B2 | 1/2016 | Omitaomu et al. | |
| 9,303,997 B2 | 4/2016 | Mcgavran et al. | |
| 2007/0287473 A1 | 12/2007 | Dupray | |
| 2009/0138415 A1* | 5/2009 | Lancaster | G06N 5/04 |
| | | | 706/11 |
| 2010/0131202 A1 | 5/2010 | Dannevik et al. | |
| 2010/0179930 A1 | 7/2010 | Teller et al. | |
| 2012/0058775 A1 | 3/2012 | Dupray et al. | |
| 2012/0265502 A1 | 10/2012 | Omitaomu et al. | |
| 2012/0303278 A1 | 11/2012 | Pasken et al. | |
| 2013/0285855 A1 | 10/2013 | Dupray et al. | |
| 2014/0129272 A1 | 5/2014 | Hanley | |
| 2014/0160325 A1 | 6/2014 | Hirai et al. | |
| 2014/0282586 A1* | 9/2014 | Shear | G06F 16/245 |
| | | | 718/104 |
| 2014/0324351 A1* | 10/2014 | Dannevik | G08B 21/10 |
| | | | 702/3 |
| 2015/0106096 A1 | 4/2015 | Toopran et al. | |
| 2015/0141043 A1 | 5/2015 | Abramson et al. | |
| 2015/0168174 A1 | 6/2015 | Abramson et al. | |
| 2015/0317589 A1 | 11/2015 | Anderson et al. | |
| 2016/0216130 A1* | 7/2016 | Abramson | G01C 21/3423 |
| 2016/0307138 A1 | 10/2016 | Heng et al. | |
| 2017/0017904 A1 | 1/2017 | Heng et al. | |
| 2017/0039307 A1* | 2/2017 | Koger | G06F 30/23 |
| 2017/0220964 A1* | 8/2017 | Datta Ray | H04L 63/1433 |
| 2018/0165554 A1 | 6/2018 | Zhang et al. | |
| 2018/0260793 A1 | 9/2018 | Li et al. | |
| 2019/0268283 A1 | 8/2019 | Mukherjee et al. | |
| 2019/0303713 A1 | 10/2019 | Kumar et al. | |

OTHER PUBLICATIONS

Fook-Luen Heng et al., "Weather-Driven Multi-Category Infrastructure Impact Forecasting", U.S. Appl. No. 15/287,846, filed Oct. 7, 2016.

Han, Seung-Ryong et al., "Estimating the Spatial Distribution of Power Outages During Hurricanes in the Gulf Coast Region," Journal of Reliability Engineering & System Safety, vol. 94, No. 2, pp. 199-210, Feb. 2009.

Karlis, Dimitris et al., "Multivariate Poisson Regression with Covariance Structure," Statistics and Computing, vol. 15, No. 4, pp. 255-265, Oct. 2005.

Li, H. et al., "A Statistical Model for Risk Management of Electric Outage Forecasts," IBM Journal of Research and Development, vol. 54, No. 3, pp. 315-325, May 2010.

List of IBM Patents or Patent Applications Treated as Related; (Appendix P), Filed Oct. 7, 2016; 2 pages.

Liu et al., "Spatial generalized linear mixed models of electric power outages due to hurricanes and ice storms", Journal of Reliability Engineering and System Safety, vol. 93, 2008, pp. 875-890.

Liu et al., "Statistical Forecasting of Electric Power Restoration Times in Hurricanes and Ice Storms", IEEE Transactions on Power Systems, vol. 22, No. 4, Nov. 2007, pp. 2270-2279.

Liu, Haibin et al., "Negative Binomial Regression of Electric Power Outages in Hurricanes," Journal of Infrastructure Systems, vol. 11, No. 4, pp. 258-267, Dec. 2005.

Zhou et al., "Modeling Weather-Related Failures of Overhead Distribution Lines", IEEE Transactions on Power Systems, vol. 21, No. 4, Nov. 2006, pp. 1683-1690.

Zhu, Dan et al., "Storm Modeling for Prediction of Power Distribution System Outages," Journal on Electric Power Systems Research, vol. 77, No. 8, pp. 973-979, Jun. 2007.

* cited by examiner

WEATHER-DRIVEN MULTI-CATEGORY INFRASTRUCTURE IMPACT FORECASTING

CROSS-REFERENCE TO RELATED APPLICATIONS

This application is a continuation of U.S. patent application Ser. No. 17/224,116, filed on Apr. 6, 2021, entitled "Weather-Driven Multi-Category Infrastructure Impact Forecasting," which is a continuation of U.S. patent application Ser. No. 16/546,268, filed on Aug. 20, 2019, entitled "Weather-Driven Multi-Category Infrastructure Impact Forecasting," issued as U.S. Pat. No. 11,048,021, which is a continuation of U.S. patent application Ser. No. 15/287,846, filed on Oct. 7, 2016, entitled "Weather-Driven Multi-Category Infrastructure Impact Forecasting," issued as U.S. Pat. No. 10,387,802, which is a continuation of U.S. patent application Ser. No. 15/075,603, filed Mar. 21, 2016, entitled "Weather-Driven Multi-Category Infrastructure Impact Forecasting," issued as U.S. Pat. No. 9,536,214, which is a continuation of U.S. application Ser. No. 15/002,494, filed on Jan. 21, 2016, entitled "Weather-Driven Multi-Category Infrastructure Impact Forecasting," issued as U.S. Pat. No. 10,989,838, which claims priority to U.S. Provisional Patent Application No. 62/147,003, filed on Apr. 14, 2015, entitled "Forecasting Weather-Driven Infrastructure Impact," all of which are incorporated in their entireties herein by reference.

BACKGROUND

The present invention relates to weather forecasting, and more specifically, to weather-driven multi-category infrastructure impact forecasting.

Weather events can impact physical infrastructure in a number of ways. Power generation and distribution systems, water supply lines, gas pipelines, and telecommunication networks are exemplary systems that may be impacted and require recovery and repair. Providers of services and utilities monitor weather forecasts to identify regions in which infrastructure may be impacted. By predicting areas where recover and repair efforts may increase due to weather, the providers are able to move equipment and personnel, as needed, to minimize the impact of weather-related infrastructure damage.

SUMMARY

Embodiments include a computer-implemented method, system, and computer program product for managing resources based on weather-related damage in a service area. The method includes selecting trouble regions within the service area, generating clustered regions, each of the clustered regions including at least one of the trouble regions within the service area and each of the trouble regions within the service area being associated with one of the clustered regions, and training a trouble forecast model for the trouble regions for each type of damage, the training for each trouble region using training data from every trouble region within the clustered region associated with the trouble region. The method also includes applying the trouble forecast model for each trouble region within the service area for each type of damage, determining a trouble forecast for the service area for each type of damage based on the trouble forecast for each of the trouble regions within the service area, and determining a job forecast for the service area based on the trouble forecast for the service area, wherein the managing resources is based on the job forecast for the service area.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, weather events can impact infrastructure (e.g., a power grid, pipeline, telecommunications network) such that repair or rebuilding is required to restore service. Forecasting the weather events facilitates planning and relocating equipment and personnel, as needed, to restore service more quickly. Currently, weather forecasts are generally used to predict weather-related damage in two ways. Regression analysis may be used to model the number of damages or outages as a function of predicted weather, and visualization methods may enable an expert to assess the risk of damage from predicted or current weather. Current analysis techniques do not account for several factors that influence the efficacy of damage prediction. When the service region or coverage area of service locations is large (e.g., 100 square miles), there may be varying asset, geographic, and weather characteristics within the area. As such, the damage or trouble profile within the area may be different. There may be multiple different types of trouble (damage) and types of jobs (repairs/reconstruction efforts). When a smaller area is analyzed to limit variations in geography and weather characteristics, historical data needed to train a model may be sparse and, thus, result in no model or a bad model. Finally, combining multiple sources of weather observation and forecast may boost model quality.

Embodiments of the systems and methods described herein account for the factors noted above. According to the embodiments, trouble regions, which are smaller than a service region, are chosen and clustered together according to their similarity, and sparse historical data among trouble regions of a cluster is grouped and scaled to normalize inter-trouble region variations. Trouble types and job types are considered, different weather forecasts are combined. The embodiments detailed below relate to aggregating trouble region trouble forecasts in order to compute service region trouble forecasts and, ultimately, service region job forecasts based on a trouble-to-job mapping. Generally, a single trouble forecast for a trouble region and a trouble type covers a window of time of duration T, which is referred to as the forecasting horizon. This forecasting horizon is divided into a set of n time periods, which are referred to as prediction periods, each of length Δ (e.g., 24 hours). For each trouble region, trouble type, and prediction period combination, a trouble count forecast is computed in the form of a random variable with a probability distribution. The probability distribution may assign a probability of 1 to a single value. The embodiments are detailed below.

Figure 1:
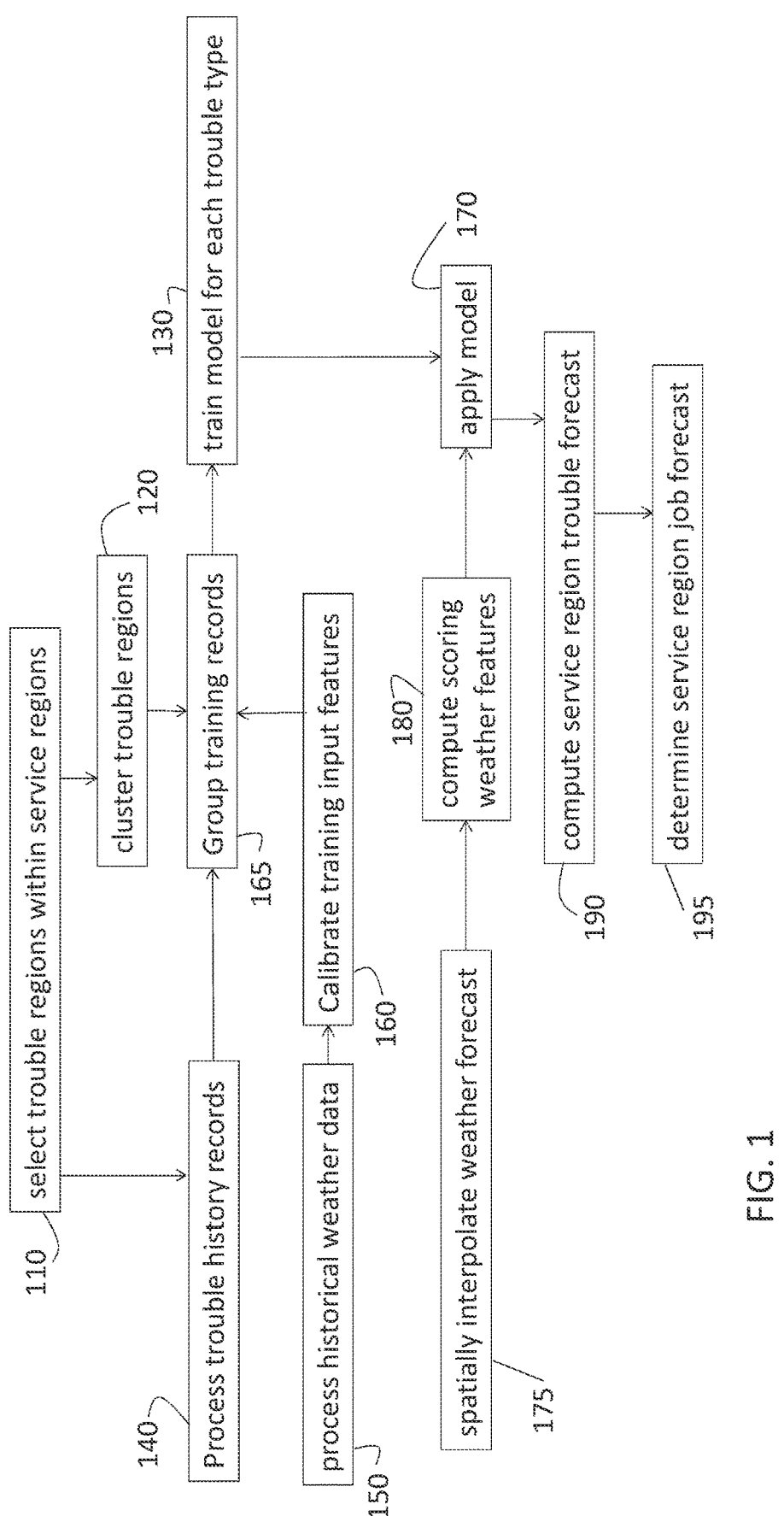
FIG. 1 is a process flow of a method of performing forecasting according to embodiments.
Figure 2:
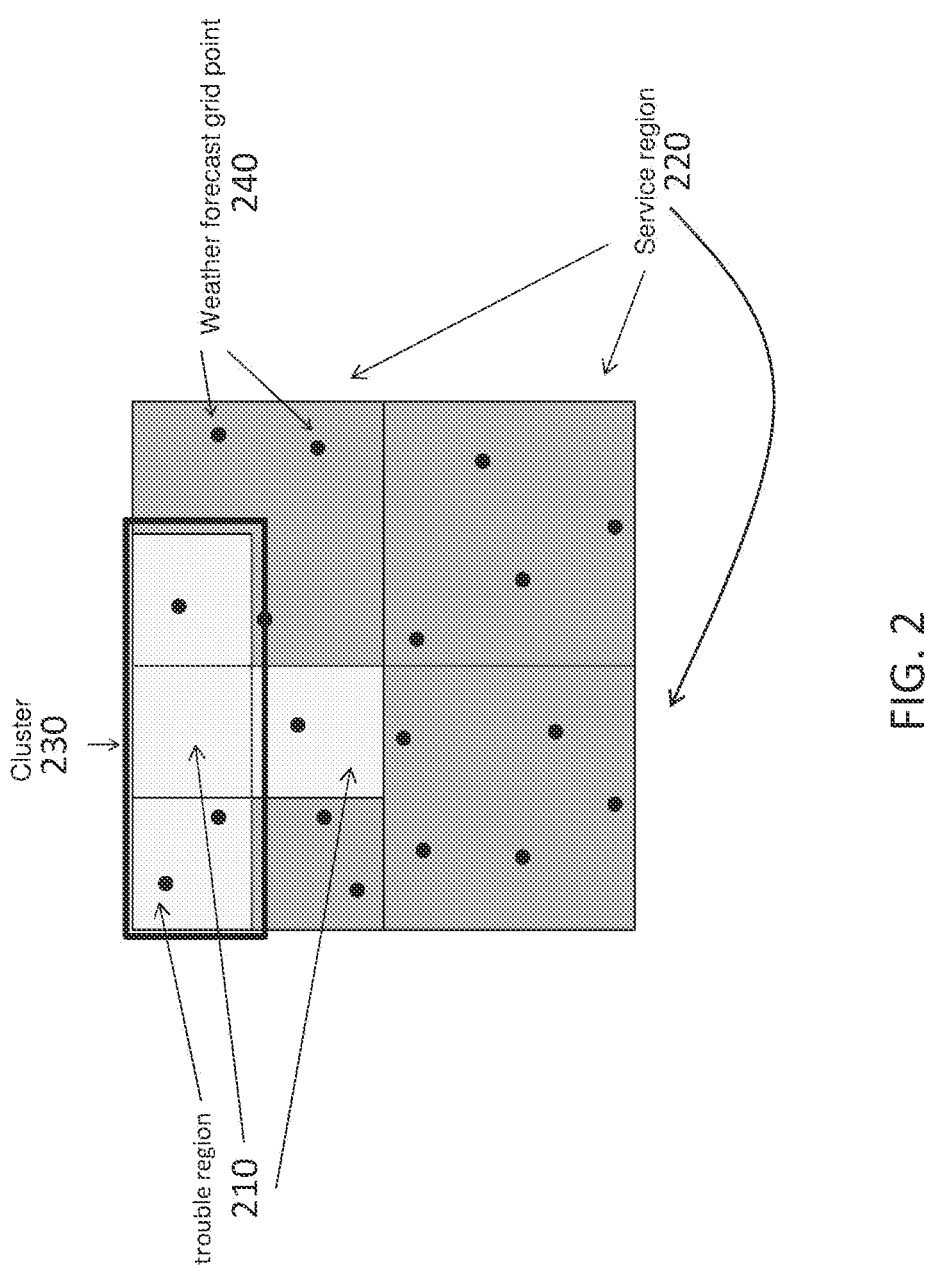
FIG. 2 shows an exemplary cluster of trouble regions according to an embodiment.

FIG. 1 is a process flow of a method of performing forecasting according to embodiments. The forecasting may be a part of resource management for a utility or other enterprise. The forecasts of trouble and corresponding jobs may be used to reallocate resources as needed to resolve weather-related issues. At block 110, selecting trouble regions 210 (FIG. 2), B: {bi}, within each of the service regions 220 is illustrated in FIG. 2. The trouble regions 210 increase spatial resolution within the service region 220. At block 120, clustering trouble regions 210 into clusters 230 (FIG. 2) includes grouping trouble regions 210 whether or not they are in the same service region 220. Clusters 230 are selected based on similarity in weather and damage. At block 130, training a model for each trouble type (type of damage) for each trouble region 210 of the cluster 230 includes several processes. The model is trained to forecast (weather-related) trouble in each trouble region 210 and for each trouble type but may benefit from using historical and other data available within the cluster 230, as further detailed below. In order to train the model, at block 140, processing trouble history records includes scaling the trouble history records to normalize inter-trouble region 210 variations as further discussed below. Processing historical weather data, at block 150, includes standardizing, interpolating and aggregating historical weather data to compute training input features as further detailed below. At block 160, calibrating training input features includes training and applying a vector valued calibration function to the training input features to reduce systematic differences between training input features and scoring input features. At block 165, grouping training records includes grouping the training records of trouble regions 210 for each cluster 230. When model training (block 130) is completed, applying a model, at block 170, includes spatially interpolating a weather forecast, at block 175, and computing scoring weather features with the interpolated data at block 180. Computing a service region 220 trouble forecast, at block 190, includes aggregating trouble region 210 trouble forecasts. At block 195, determining a service region 220 job forecast includes applying a trouble-to-job mapping. The processes identified in FIG. 1 are further detailed below.

FIG. 2 shows an exemplary cluster 230 of trouble regions 210 according to an embodiment. All the trouble regions 210 of a cluster 230 need not be of the same size. Each service region 220 includes one or more weather forecast grid points 240 according to the example shown in FIG. 2. However, a given service region 220 may not include any weather forecast grid point. Each weather forecast grid point 240 is a point on a computational mesh used by the weather forecasting model. The weather forecast model produces a time-dependent set of values (time series) for multiple weather features at each weather forecast grid point 240. The weather features may include wind speed, wind direction, temperature, and pressure, for example. The weather forecast model may produce such time series for many (e.g., thousands) of weather forecast grid points 240 that collectively cover an area (e.g., state, country). It is assumed that the coverage area of the weather forecast is mostly overlapping and completely covers the collective area of the service regions 220. Trouble regions 210 are subdivisions within a service region 220 that facilitate a higher resolution view of the service region 220. This is because the service region 220 is generally too large to experience homogenous weather (and, thus, damage). The trouble regions 210 may be selected in a number of ways and may be selected based on a desired size or resolution within each service region 220, for example. In the exemplary case of a power utility, trouble regions 210 may be selected in association with substations or feeders. Trouble regions 210 may result from uniform random discretization, as well. Generally, the goal may be to choose trouble regions 210 such that weather within each trouble region 210 is uniform. As noted above, when too small an area is chosen, sparse historical and current data may become an issue in generating accurate forecasts.

To overcome this issue, two or more trouble regions 210 may be combined into a cluster 230 and treated as one unit. A cluster 230 of trouble regions 210 may be selected in a number of ways to have various different similarities, for example. One exemplary algorithm for choosing a cluster 230 is indicated below:

```
D: Distance matrix, D(i, j) is distance between trouble regions i and j.
A: Adjacency matrix, A(i, j) = 1 if i, j are adjacent, else 0.
M: A vector of goodness metric for every trouble region. M(i) indicates
   how good the training data is for trouble region i.
T: A minimum required value of M for any trouble region
B: Set of all trouble regions
Q: Empty sorted map sorted by increasing value of the value
MergeTroubleRegions (D, A, M, B, Q, T) {
    for each (r in B) {
        if (M(r) < T)
            Q.insert (r, M (r))
    } .
    while (!Q.empty ( ) && B.size ( ) > 1) {
        (r,m) = Q.pop ( ) ;
        r1 = r1 : min (D (r1,r)) && A (r, r1) == 1 // nearest adjacent
trouble region to r
        rnew = Combine (r, r1)
        Update D, A, M, Q // remove r, r1 and add rnew if (M
        (rnew) < T)
            Q. insert (rnew, M (rnew))
    }
{
```

The algorithm above includes adjacent trouble regions 210 in a cluster 230 to achieve a minimum required goodness metric for training data. An exemplary goodness metric is the number of records of trouble in the combined trouble records of the trouble regions 210 in a cluster 230. Another exemplary goodness metric is the average number of trouble instances per prediction period, computed over the prediction periods with at least one instance of trouble, from the combined trouble records of the trouble regions 210 in a cluster 230. Other goodness metrics are possible in alternate or additional embodiments. According to alternate embodiments, trouble regions 210 may be clustered based on similarities in location and geography. For a utility-based application, such as an electric utility, similarities in demographics and the number of utility poles may additionally or alternately be used to form a cluster 230. While the use of trouble regions 210 provides spatial granularity, the use of clusters 230 addresses any data sparseness issues.

As noted above, training a model (at block 130) involves processing trouble history records (FIG. 1, block 140). Processing the trouble history records at block 140 refers to normalizing inter-trouble region 210 variations. Normalizing inter-trouble region variations refers to the multiplication of the trouble counts in each trouble record of a trouble region 210 with a scaling factor of that trouble region 210 as described earlier. Trouble regions 210 within a single cluster 230 may have different trouble rates, meaning that for the same weather pattern, trouble region 210A may have, in general, higher instances of trouble (e.g. damage) than trouble region 210B. This may be caused by a variety of factors, such as trouble region 210A having more equipment than trouble region 210B, or trouble region 210A having older and weaker equipment than trouble region 210B, for example. To account for this variation in trouble rates between trouble regions 210 of the same cluster 230, a scaling factor may be used on the trouble counts obtained in the trouble records for each trouble regions 210 of a cluster 230. The scaling factor may be different for each combination of trouble region 210 and trouble type. It may be computed in a variety of different ways, such as the number of utility poles in each trouble region 210, or the average number of trouble instances per day seen in each trouble region 210, for example. The inverse of the scaling factor has to be multiplied with the prediction of trouble count for each trouble region 210 during scoring.

Figure 3:
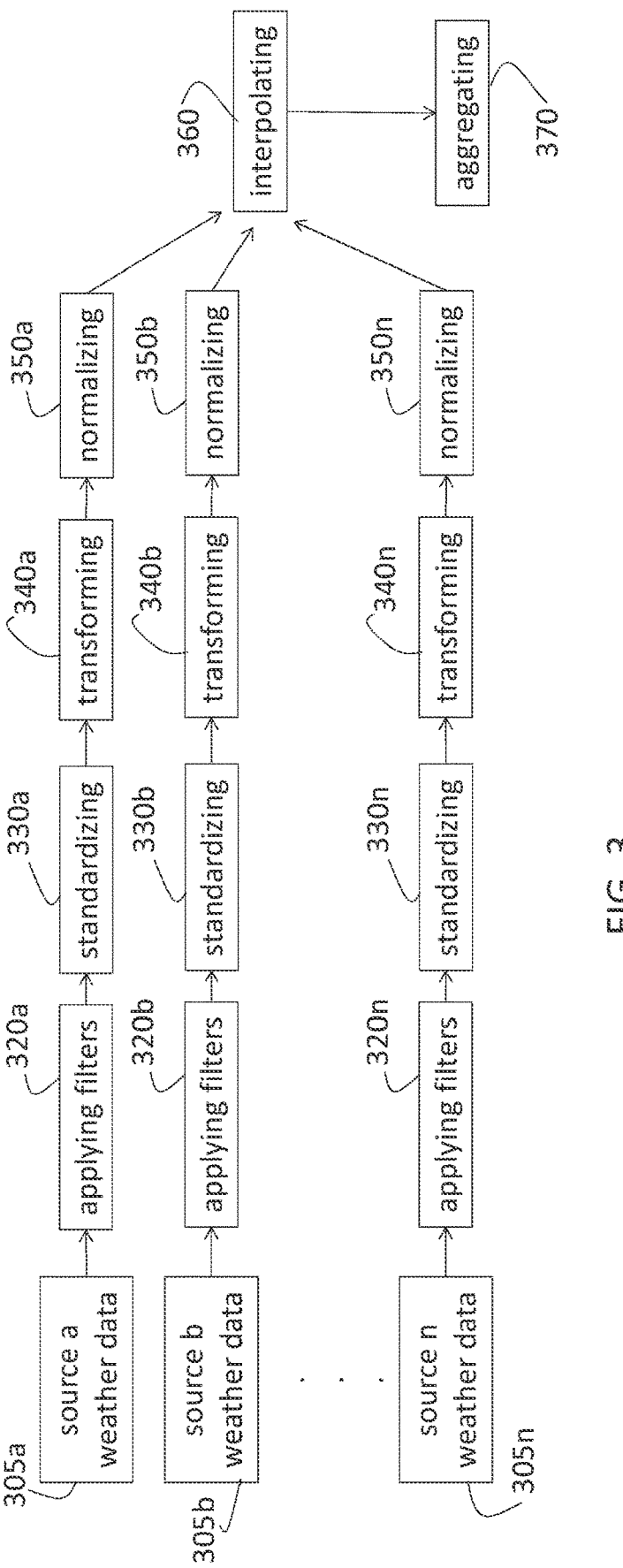
FIG. 3 shows processes performed, on a per-trouble region basis, on the (historical) weather data collected by various sources according to an embodiment.

Training the model also involves processing historical weather data (FIG. 1, block 150). FIG. 3 shows processes performed, on a per-trouble region 210 basis, on the (historical) weather data collected by various sources 305 according to an embodiment. Historical weather data may be weather observation records obtained from a number of sources 305a-305n (e.g., WeatherBug, a National Oceanographic and Atmospheric Administration (NOAA) Metar station, an NOAA Mesonet station). The different sources 305 may have collected weather data at different intervals and may have used different units. Historical weather data may additionally, or alternatively, be weather forecasts run for days in history. These historical weather data are comprised of time-varying values for a variety of weather features, such as wind speed, temperature, pressure, for example, at certain geographical locations. In the case of observation data, the locations are where there are weather stations installed. In the case of weather forecasts, the locations are the weather forecast grid points 240 (FIG. 2) on the computational mesh used by the weather forecast model. These geographical locations are referred to as weather locations. Applying filters, at block 320a-320n, refers to filtering out low confidence data with data quality filters. Each data quality filter may be specific to a given data source or may apply to multiple weather data sources. The standardizing, at block 330a-330n, includes converting all units to standard units (e.g., coordinated universal time (UTC) for time, Kelvin for temperature, meters per second (m/s) for wind speed, millimeters (mm) for precipitation, Pascal for pressure). The transforming, at block 340a-340n, refers to transforming the historical weather data from the different sources to common weather features (e.g., calculating relative humidity from temperature and dew point, calculating station pressure from sea level pressure and elevation). The normalizing, at block 350a-350n, involves normalizing the various observation intervals of the various weather data sources to a common repeating time interval (e.g., hourly) resulting in a normalized time series for each weather feature at each weather location. This common repeating time interval is of length $\delta$ and is called the normalized time step. The time points at which the normalized time series has values are called the normalized time points. Exemplary hourly features include minimum temperature, maximum temperature, average wind speed, maximum wind speed, maximum wind gust, maximum humidity, minimum pressure, maximum pressure, accumulated rain, and rain rate.

The interpolating, at block 360, refers to estimating the normalized time series for weather features of interest at a location that is representative of a trouble region 210, for each trouble region 210 of interest. An example location of interest is the centroid of the polygon representing the trouble region 210. For each trouble region 210, for each weather feature of interest (e.g., temperature, rainfall), the time range of training data is divided into aggregation time intervals of length $\Delta$. An example aggregation time interval length $\Delta$ is 24 hours (a day). For each such aggregation time interval, k weather locations are selected. The k locations may be observation stations or forecast locations that are both nearest to the centroid of the trouble region 210 and have a minimum number, p, of non-null values at the normalized time points within the aggregation time interval. As an example, p may be 50% of $\Delta/\delta$, k may be 3 locations, but more or fewer locations may be selected based on the feature of interest, the application, and other factors. The feature of interest may affect the selection of k because not every observation or forecast station may record all the same information. Thus, based on the feature of interest, a given station may or may not be helpful. The selection of k may change over time from one aggregation interval to another, as well. Each (training) weather feature of interest may then be computed at each normalized time point within any given aggregation time interval as:

$$V = \sum_{i=1}^{k} \frac{\frac{v(i)}{\text{distance}(i)}}{\sum \frac{1}{\text{distance}(i)}} \qquad \text{EQ. 1}$$

The value of the weather feature at weather location (i) is v(i), and the distance from weather location (i) to the centroid of the trouble region 210 is distance(i).

The aggregating, at block 370, refers to computing the model input features from the interpolated normalized time series for the weather features of interest, by applying the appropriate aggregation function to the normalized time series, for each aggregation interval. Examples of aggregation functions are minimum, maximum, average, accumulate, and number of exceedences over a threshold. Example input features are the daily maximum temperature, daily minimum temperature, daily minimum pressure, daily maximum wind gust speed, daily maximum reflectivity, number of exceedences of wind gust speed over 40 mph in a day, and month of the year. An input feature vector is computed for each aggregation period in the training data time range, and for each trouble region 210. Each input feature vector is a collection of values, with one value for each input feature. The resulting collection of input feature vectors is called the training input feature data set. The combination of a training input feature vector and the corresponding trouble count for a single trouble type from the trouble record of the same trouble region 210, and for the same prediction period, is called a training record.

As discussed above, training input features may be computed, at least in part, using weather observations. Scoring input features are computed from weather forecasts. To remove any systematic differences between training input features and scoring input features, the training inputs features may be calibrated (at block 160, FIG. 1) against the scoring input features. The vector-valued function may be trained using any statistical inference or machine learning techniques. For example, the vector-valued function may be a multi-variate linear model that is trained using multivariate multiple linear regression. This function can be trained on a calibration data set that includes scoring input feature vectors and training input feature vectors for the same prediction periods. These scoring input feature vectors may be generated specially for this calibration process, or may be generated as part of the normal scoring performed by the system, and then applied into the calibration process. The vector-valued function is then applied to every input feature vector in the training input feature data set to compute the calibrated training input feature data set. The combination of a calibrated training input feature vector and the corresponding trouble count for a single trouble type from the trouble record of the same trouble region 210, and for the same prediction period, is called a calibrated training record.

Grouping the training records (block 165, FIG. 1) refers to the grouping of calibrated training records (from block 160) of trouble regions 210 in each cluster 230. This results in a group of training records for each cluster 230 and trouble type. Each such group can be then used to train a trouble model for the corresponding cluster 230 and trouble type.

As noted in the discussion of FIG. 1, the processes involved in forecasting according to embodiments described herein include training a (trouble forecasting) model for each combination of trouble region 210 (FIG. 1, block 130) and trouble type. The model may be a two-part model according to an exemplary embodiment. The first part may involve trouble classification based on a decision tree, support vector machine (SVM), or neural network, for example. At a given time step for each trouble type, the trouble classification indicates whether the trouble process is triggered. Trouble types may be specific to the application. In the exemplary application of a power utility, trouble types may include a single-customer outage, a multi-customer outage, and a downed wire without any outage. Trouble types may be thought of as types of damage. Thus, in the exemplary power utility application, other exemplary trouble types may involve pole damage due to trees and transformer failure. In airline operations applications, trouble types may include flight delays, icing, and plane technical failure, for example. In agriculture, for example, trouble types can refer to crop damage due to extreme weather events like hail. As discussed below, a trouble type may be associated with one or more jobs of one or more given job types or may not be associated with a job. The second part of the two-part model may involve a trouble count regression based on a generalized linear model such as a Poisson, negative binomial, or binomial model. For a trouble process (of a trouble type in a given prediction period) that has been triggered, the trouble count regression indicates the number of instances of trouble (of the trouble type) that are expected.

Once the (trouble forecasting) model is trained for a given trouble region 210 and trouble type, applying the model (FIG. 1, 170) provides the trouble forecast as a time series $D_t$. To apply the model, weather forecast data (taken as a time series $F_t$) is spatially interpolated to centroids of the trouble region or regions 210 of interest. Scoring input features are computed from the interpolated weather forecast at each centroid (each trouble region 210 of interest). For each trouble region 210, trouble type, and prediction period in the forecasting horizon, the trouble model for that trouble region 210 and trouble type is evaluated on the scoring input features for that trouble region 210. The result is a probability distribution of a trouble count random variable for that trouble region 210, trouble type and prediction period. This random variable is then divided by the scaling factor for the combination of this trouble region 210 and trouble type, resulting in a scaled random variable. This scaled random variable is the trouble forecast for the same trouble region 210, trouble type and prediction period. This computation is applied for all combinations of trouble regions 210, trouble types and prediction periods in the forecasting horizon, that are of interest. Aggregating trouble forecasts $D_t$ of trouble regions 210 within a service region 220 for each trouble type provides the trouble forecast $E_t$ for the service region 220 (FIG. 1, 190) for each trouble type. The aggregating may include addition of Poisson random variables by adding mean values. The aggregating may instead include convolution using numerical quadrature methods to compute the probability density function of the aggregated trouble forecast. Finally, with the trouble forecast for each trouble type for a given service region 220, the job forecast J for the service region 220 may be determined (FIG. 1, 195) based on a trouble-to-job type mapping. The trouble forecast and job forecast may be used in resource management to significantly improve the time to resolve weather related service interruptions and infrastructure damage.

Figure 4:
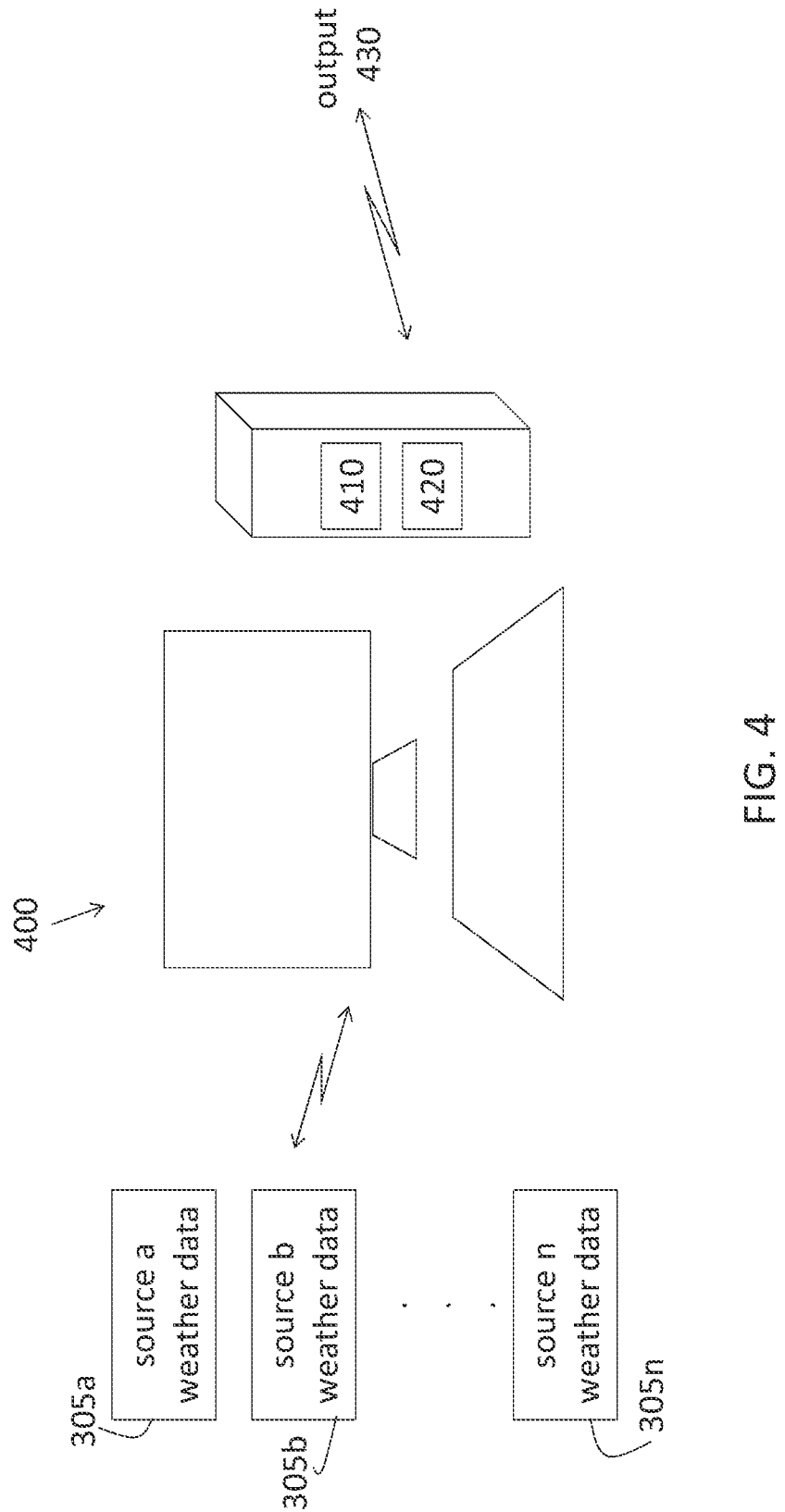
FIG. 4 depicts a system to manage resources according to embodiments.

FIG. 4 depicts a system 400 to manage resources according to embodiments detailed herein. The system 400 receives inputs of weather data from a number of sources 305. The system 400 includes one or more memory devices 410 to store instructions and data. The system 400 also includes one or more processors 420 to perform the processes discussed above to train a trouble forecasting model and ultimately output trouble and job forecasts. The system 400 may additionally include known display devices and interfaces to receive and output information. The information from the system 400 may be provided as output 430 to a display device, a controller of the resources or the like so that actions may be taken to address the damage and required jobs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory computer program product, the non-transitory computer program product comprising a computer readable storage medium having instructions embodied therewith, the instructions executable by at least one processor to perform a method comprising:

receiving a plurality of trouble regions within a service area;

determining clustered regions, each of the clustered regions including at least one of the trouble regions within the service area, the at least one of the trouble regions of each cluster region being clustered based on similar weather and similar weather-related damage at least one of the clustered regions including at least two of the trouble regions within the service area, the at least one of the plurality of trouble regions being smaller than the service area;

receiving historical weather data of any number of the plurality of trouble regions;

for each clustered region, clustering the historical weather data for each of the trouble regions of that particular clustered region to generate clustered historical weather data for that particular clustered region;

for each of the trouble regions:

training a plurality of trouble forecast models for each type of weather-related damage, each of the plurality of trouble forecast models being for a different type of weather-related damage, each of the plurality of trouble forecast models being trained using the clustered historical weather data for the clustered region that the particular trouble region is a member;

applying one or more of the trouble forecast models for the at least one troubled region using a new weather forecast for an area that includes the troubled region within the service area to obtain a trouble forecast for the particular trouble region within the service area; and continuously updating the trouble forecast models with new weather data from one or more weather observation sources by applying data filters to filter out low confidence data from the new weather data, wherein the low confidence data comprises data that fails to meet data source-specific quality thresholds, transforming the new weather data to common weather features including at least one of relative humidity, station pressure, temperature, wind speed, wind direction, pressure, accumulated rain, or rain rate, calibrating training input features using statistical influence techniques and retraining the trouble forecast models using the calibrated new weather data;

determining a regional job forecast for a geographic service area based on the trouble forecast for the geographic service area according to a trouble-to-job mapping, wherein managing resources is based on the regional job forecast for the service area; and providing the regional job forecast for the geographic service area in order to initiate resource facilitate management of resources by relocating equipment and personnel within the service area according to the regional job forecast, in order to minimize an impact of the trouble forecast.

2. The non-transitory computer program product of claim 1, wherein the impact comprises an amount of time required to resolve weather-related damage to the resources.

3. The non-transitory computer program product of claim 1, wherein the impact comprises an amount of time required to resolve a weather-related interruption to service in the service area.

4. The non-transitory computer program product of claim 1, wherein the training the plurality of trouble forecast models is further based on trouble history records.

5. The non-transitory computer program product of claim 1 further comprising collecting historical data from one of a National Oceanic and Atmospheric Administration (NOAA) Metar station or a NOAA Mesonet station.

6. The non-transitory computer program product of claim 1, wherein determining clustered regions further comprises generating cluster regions based on similarity of the trouble regions in at least one of job type or distance.

7. The non-transitory computer program product of claim 1, wherein determining the regional job forecast for the service area based on the service area comprises determining a forecasting horizon for each trouble region and each type of weather-related damage.

8. The non-transitory computer program product of claim 7 further comprises, dividing the forecasting horizon into a plurality of prediction periods.

9. The non-transitory computer program product of claim 8, wherein determining the regional job forecast for the service area based on the service area further comprises computing, for each trouble region, trouble type and the plurality of prediction periods, a trouble count forecast based on a probability distribution.

10. A system for managing resources based on weather-related damage in a service area, the system comprising:

at least one processor; and memory including instructions executable by the at least one processor to configure the at least one processor to:

receiving a plurality of trouble regions within a service area;

determining clustered regions, each of the clustered regions including at least one of the trouble regions within the service area, the at least one of the trouble region of each cluster region being clustered based on similar weather and similar weather-related damage at least one of the clustered regions including at least two of the trouble regions within the service area the at least one of the plurality of trouble regions being smaller than the service area;

receiving historical weather data of any number of the plurality of trouble regions;

for each clustered region, clustering the historical weather data for each of the trouble regions of that particular clustered region to generate clustered historical weather data for that particular clustered region;

for each of the trouble regions:

training a plurality of trouble forecast models for each type of weather-related damage, each of the plurality of trouble forecast models being for a different type of weather-related damage, each of the plurality of trouble forecast models being trained using the clustered historical weather data for the clustered region that the particular trouble region is a member;

applying one or more of the trouble forecast models for the at least one troubled region using a new weather forecast for an area that includes the troubled region within the service area to obtain a trouble forecast for the particular trouble region within the service area; and continuously updating the trouble forecast models with new weather data from one or more weather observation sources by applying data filters to filter out low confidence data from the new weather data, wherein the low confidence data comprises data that fails to meet data source-specific quality thresholds, transforming the new weather data to common weather features including at least one of relative humidity, station pressure, temperature, wind speed, wind direction, pressure, accumulated rain, or rain rate, calibrating training input features using statistical influence techniques and retraining the trouble forecast models using the calibrated new weather data;

determining a regional job forecast for a geographic service area based on the trouble forecast for the geographic service area according to a trouble-to-job mapping, wherein managing resources is based on the regional job forecast the service area; and providing the regional job forecast for the geographic service area in order to initiate resource facilitate management of resources by relocating equipment and personnel within the service area according to the regional job forecast, in order to minimize an impact of the trouble forecast.

11. The system of claim 10, wherein the impact comprises an amount of time required to resolve weather-related damage to the resources.

12. The system of claim 10, wherein the impact comprises an amount of time required to resolve a weather-related interruption to service in the service area.

13. The system of claim 10, wherein the training the plurality of trouble forecast models is further based on trouble history records.

14. The system of claim 10, further comprising collecting historical weather data from one of a National Oceanic and Atmospheric Administration (NOAA) Metar station or a NOAA Mesonet station.

15. The system of claim 10, wherein determining clustered regions further comprises generating cluster regions based on similarity of the trouble regions in at least one of job type or distance.

16. The system of claim 10, wherein determining the regional job forecast for the service area based on the service area comprises determining a forecasting horizon for each trouble region and each type of weather-related damage.

17. The system of claim 16, wherein the at least one processor is configured to determine the regional job forecast for the service area based on the service area further comprises the at least one processor configured to compute, for each trouble region and type of weather-related damage, a trouble count forecast based on a probability distribution.

18. The system of claim 17, wherein determine the regional job forecast for the service area based on the service area further comprises computing, for each trouble region, trouble type and a plurality of prediction periods, a trouble count forecast based on a probability distribution.

* * * * *